United States Patent [19]

Minor et al.

[11] Patent Number: 4,608,562
[45] Date of Patent: Aug. 26, 1986

[54] ADDRESS PERSONALIZATION OF A REMOTELY ATTACHED DEVICE

[75] Inventors: Richard G. Minor; Alexander Polischuk-Sawtschenko, both of Raleigh, N.C.

[73] Assignee: International Business Machines Corp., Armonk, N.Y.

[21] Appl. No.: 546,771

[22] Filed: Oct. 31, 1983

[51] Int. Cl.⁴ .............................................. H04Q 9/00
[52] U.S. Cl. .......................... 340/825.59; 340/825.22; 340/825.52
[58] Field of Search ............ 340/825.59, 825.52, 340/825.22, 825.43, 825.42; 370/78, 27, 83; 375/36

[56] References Cited

U.S. PATENT DOCUMENTS

| | | | |
|---|---|---|---|
| 3,721,763 | 3/1973 | Homan et al. | 375/36 |
| 3,964,023 | 6/1976 | Fauchez | 340/825.59 |
| 4,168,469 | 9/1979 | Parikh et al. | 370/83 |
| 4,529,980 | 7/1985 | Liotine et al. | 340/825.52 |

Primary Examiner—Donald J. Yusko
Attorney, Agent, or Firm—Joscelyn G. Cockburn

[57] ABSTRACT

In a data transmission system comprising of a transmitting unit, a plurality of remote devices, and one or more serial communication links interconnecting the devices to the transmitting unit the polarities of a serially transmitted test signal and a locally generated control signal are used to provide unique addresses for identical devices connected to the transmitting unit. The technique provides a dynamic scheme for assigning addresses to identical devices.

12 Claims, 6 Drawing Figures

ADDRESS PERSONALIZATION OF A REMOTELY ATTACHED DEVICE

BACKGROUND OF THE INVENTION (1) Field of the Invention

The invention relates generally to the control of I/O devices and more particularly to an apparatus and method for assigning addresses to remote devices which are connected via a transmission link to a supervisory unit.

(2) Prior Art

Modern data processing systems, such as computer installations, point-of-sale terminals, banking terminals, etc. consist of a central processing unit (CPU), a plurality of input/output devices, and one or more communication channels for interconnecting the input/output devices to the central processing unit. Information in the form of messages is exchanged between the CPU and the I/O device. Oftentimes, a single communication channel connects a plurality of devices to the CPU. Also, a common code may be used to communicate with a particular group of devices. For example, all printers or display devices or tape drives, etc. may be assigned a particular code.

For data exchange purposes, the CPU prepares a message, incorporates the particular device code and transmits the message to the device. If only one device of a given type is coupled to the CPU, then that device will respond. However, when multiple devices of the same type are connected to the CPU, each device could attempt to respond. This would cause a problem since the CPU cannot distinguish one I/O device from another.

In order to alleviate the problem, it is necessary that a unique address be assigned to each of the same type of device. When communicating (i.e., receiving/transmitting messages) with an I/O device, the address of the target device is inserted in the message. Since each device is provided with a unique address, only the device whose address is in the message will communicate with the CPU. It is common practice for an operator to manually set the address of an I/O device. However, such settings require a switch or other mechanical mechanism which is costly and subject to failure. Moreover, such settings are susceptible to human error which may cause the wrong unit or units to respond to the CPU or multiple units responding.

U.S. Pat. No. 3,221,307 attempts to solve the human error problem by disclosing an automatic initialization technique for establishing an address for each of a plurality of tape units. In the patent several tape units are connected to a computer through common data and control paths. A circuit is provided for individually selecting the tape units in a predetermined order. As a tape unit is selected, its tape is interrogated and read for address information. The address indicated on the selected tape unit is sent to the computer. Electrical signals are returned to the tape units by the computer on the normally available address lines connecting all of the tape units in common for setting a register, in the selected tape unit, to addresses indicated in the normal address lines. After all of the tape units are set, normal operation is initiated. Whenever the normal address bus between the computer and the tape units indicates an address which corresponds to an address stored in a register of a tape unit, the tape unit which contains the corresponding address is selected.

U.S. Pat. No. 4,387,371 is another example of a prior art technique used in assigning a unique address to one of a plurality of remotely coupled devices. In the patent, a transmitter transmits messages to N receivers by means of a link. The messages include a preamble which is structured so that all or one receiver will respond and use the message.

SUMMARY OF THE INVENTION

It is, therefore, an object of the present invention to provide a more efficient apparatus and method for assigning unique addresses to identical remotely coupled devices.

The objective is achieved in a system where at least two identical devices are connected to a supervisory unit (computer) by means of a high speed serial communication link. The supervisory unit is provided with means for preparing and transmitting signals. The normal signals are transmitted from one port with a normal polarity and from another port with a reversed polarity. Each of the remotely coupled devices is provided with means for generating a control signal having normal and reverse polarities. On receiving the signals, the device first combines the signals with the normal polarity control signal and then with the reverse polarity control signal to form two composite signals. One composite signal is the original signal, the other is the negative (inverted) of the original signal. The device then interrogates and reads the composite signals. The device which is able to read a composite signal formed from the normal polarity signal and a transmitted test signal takes on, through internal programming, a unique address. The other device which reads a composite signal formed from the transmitted test signal and the inverse polarity control signal takes on another unique address. After the addresses are set, that device is ready to begin normal operation. Whenever the supervisory unit elects to communicate with a remote device, the device address is incorporated in the message. Because the address is unique, only the selected device will respond to the message.

The foregoing and other features and advantages of the invention will be more fully described in the accompanying drawings.

DETAILED DESCRIPTION OF THE PREFERRED EMBODIMENT

Figure 1:
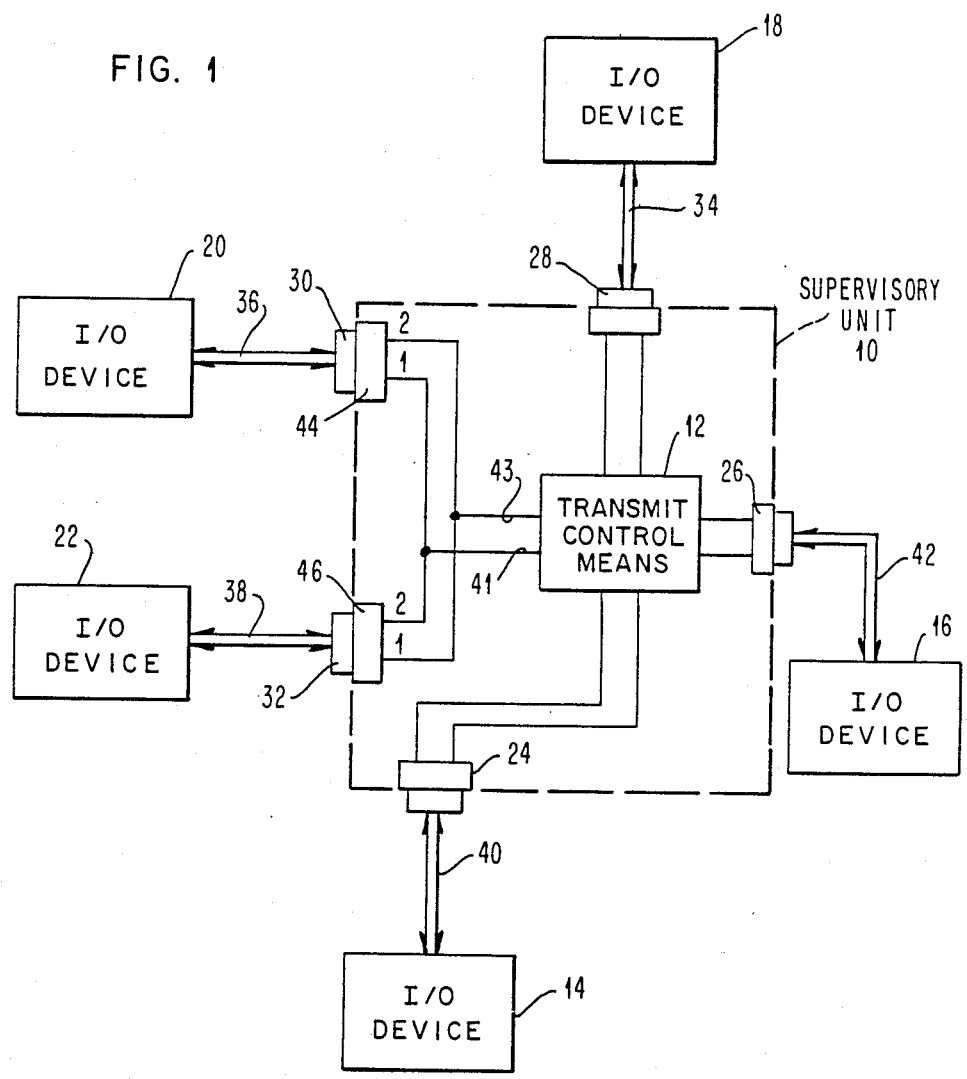
FIG. 1 shows a block diagram of a data transmission system embodying the invention.

FIG. 1 shows a communication system embodying the teaching of the present invention. The communication system is comprised of a supervisory unit 10. The supervisory unit 10 further includes a transmitting/control means identified by numeral 12. The function of the transmitting/control means 12 is to generate and prepare messages (in a format to be described hereinafter) and transmit the messages to a plurality of remote I/O devices identified by numerals 14 through 22. The transmitting/control means 12 includes a conventional transmitter and a controller which may be generated from combinatorial logic or a programmed microcomputer. The structure and design of such devices (both transmitter and microcomputer) are well within the skill of one skilled in the art. Therefore, the details of such devices will not be given. Suffice it to say that in the preferred embodiment of the present invention the controller is a programmable microcomputer.

Still referring to FIG. 1, the supervisory unit 10 includes a plurality of I/O connectors identified by numerals 24–32. The I/O connectors are the output ports to which the I/O devices are connected via a plurality of serial communication links identified by numerals 34–42. Except for I/O devices 20 and 22, respectively, each of the I/O devices 14–18 are different and distinct. For example, one of the I/O devices may be a printer, another one of the I/O devices may be a display unit and so forth. Each of the I/O ports is wired with a two-wire topology to the controller 12. Preferably, the I/O ports or connectors include a receptacle which is firmly attached to the supervisory unit 10 and a pluggable section which is coupled to the serial communication links. Although a two-wire system is used to couple I/O ports to the controller 12, it is within the skill of one skilled in the art to change the wiring topology without deviating from the scope of the present invention.

Still referring to FIG. 1, I/O devices 20 and 22 are identical. A common device code is used to address the identical devices. This being the case, each of the identical devices must be assigned a unique address. The supervisory unit 10 uses the unique addresses (in a manner to be described hereinafter) to communicate with a selected device. I/O port 30 couples I/O device 20 to supervisory unit 10. In wiring I/O port 30, conductors 41 and 43 are connected to receptacle 44. However, in wiring receptacle 46 the conductors are reversed. For example, if conductor 43 is connected to terminal 2 in receptacle 44, conductor 43 is reversed and is coupled to terminal 1 of receptacle 46. Likewise, conductor 41 is connected to terminal 1 of receptacle 44 and conductor 41 is connected to terminal 2 of receptacle 46. As will be described in more detail hereinafter, this wiring topology ensures that the electrical signal which appears at receptacle 44 is the reverse of the electrical signal which appears at receptacle 46. These signals, which have reversed and normal polarities, are transmitted over serial communicating links 36 and 38, respectively, to I/O devices 20 and 22.

Figure 2:
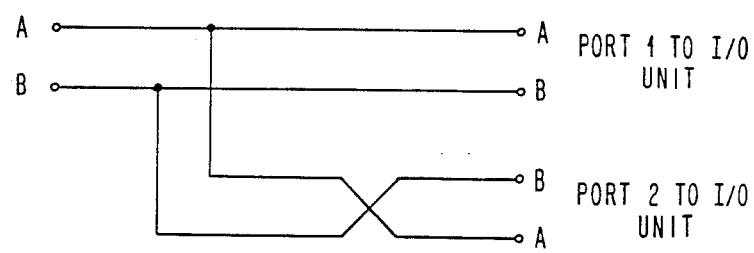
FIG. 2 shows a wiring diagram for a differential two-wire signal.
Figure 3:
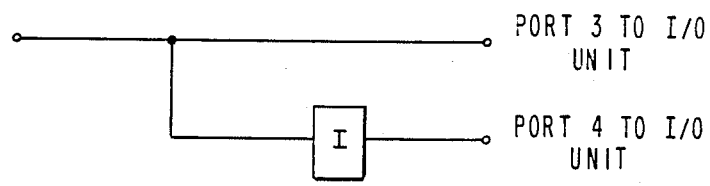
FIG. 3 shows a wiring diagram for a single-ended normal TTL, one wire signal.

As is used hereinafter, the signal outputted at receptacle 44 is called a normal polarity signal. Similarly, the signal at terminal 46 is called a reverse polarity signal. Of course, there are alternative ways for generating normal and reverse polarity signals without deviating from the scope of the present invention. As stated previously, I/O devices 20 and 22 are identical devices. Each device is fitted with control means (to be described hereinafter) which process the normal and reverse polarity signals and decide which one of the two devices should respond to the transmitted message. The wiring in FIGS. 1 and 2 assumes that the signal (to be described hereinafter) is a differential (two-wire) signal. With reference to FIG. 2, port 1 includes terminals A and B. Similarly, port 2 includes terminals B and A. However, this should not be construed as a limitation on the scope of the present invention. The invention is intended to cover other types of wiring topologies; for example, if the signal is single-ended (normal TTL one-wire), then the polarity of the signal is reversed by an inverter (see FIG. 3). In FIG. 3 port 3 would be at the supervisory unit and represent one I/O port while port 4 represents the other I/O port. Of course, it is well within the skill of one skilled in the art to devise other wiring topologies without departing from the scope of the present invention.

Still referring to FIG. 1, each of the I/O devices 14, 16 and 18 represent different types of I/O devices; for example, printers, displays, keyboards, etc. Each type of device has unique identifying codes which are placed in the address field of the message (to be described hereinafter). A device seeing its address code in the message will accept the message and respond accordingly to the supervisory unit. The situation with devices 20 and 22 is somewhat different. These devices are identical devices and without the present invention each device would attempt to respond to a message which includes a common address and/or identifying code. The objective, therefore, is to have either I/O device 20 or 22 coupled to either I/O ports 30 or 32, respectively. Either I/O device will respond to either a first or second address depending on whether it is connected to port 30 or port 32, respectively.

Figure 6:
FIG. 6 shows a schematic for the structure of the transmitted message.

As stated previously, messages are routed to a selected I/O device based upon its unique address in the message. The data in each message is transmitted in the form of serial electrical signals such as bisync and/or start-stop. The messages are generated and assembled by control unit 12. Referring to FIG. 6 for the moment, there is shown a structure for the message which is transmitted to each device. The message includes a beginning delimiter and an end delimiter. The function of the delimiter field is to indicate the beginning and end of the message. The message includes a plurality of other fields. Such message formats are well known in the art and details will not be given. Suffice it to say that the other fields include data fields and an address field. The address fields carry the address which can be used by one of the identical I/O devices 20 or 22 to generate a unique address which is subsequently used for addressing that device after the initial address assignment.

Figure 4:
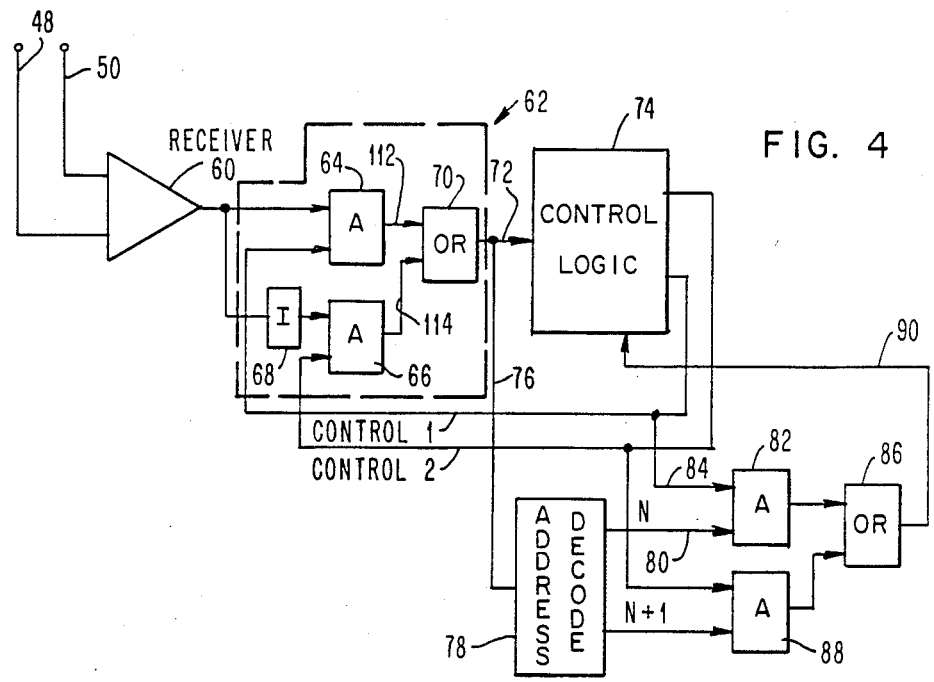
FIG. 4 shows a schematic of the electrical circuit which resides in the remotely coupled devices. The circuit processes the transmitted test signals with the locally generated signals and assigns an address to the device.

FIG. 4 shows an electrical circuitry which monitors messages, transmitted from the supervisory unit 10 (FIG. 1), and decides which identical unit to respond to a particular message. Each of the identical I/O devices 20 and 22 (FIG. 1) is fitted with the same electrical circuit. Therefore, only one of the electrical circuits will be described. It is understood that each identical unit which is connected to the supervisory unit will be fitted with the same electrical circuitry. As was stated, in the preferred embodiment of this invention, the electrical signal is a differential two-wire signal. To this end, conductors 48 and 50 form the communication link which couples the identical unit to the supervisory unit. The serial signal which is placed on conductors 48–50, respectively, is fed into receiver 60. The receiver 60 is a conventional receiver and since its construction is well known in the art, details will not be given. Suffice it to say that the signals which were fed into receiver 60 are processed in a conventional manner and are fed into a block of combinatorial logic identified by numeral 62. The function of combinatorial logic will be described hereinafter. The combinatorial logic is comprised of AND circuits 64 and 66, respectively. Each AND circuit is a two-way AND circuit. One of the inputs to AND circuit 64 is fed by the output from receiver 60. One of the inputs to the other AND circuit is fed with the reversed or inverted output signal. The signal is reversed by passing it through an inverting circuitry identified by numeral 68. The outputs of both AND circuits are fed over conductors 112 and 114, respectively, into OR circuit 70. The output from OR circuit 70 is fed over conductor 72 into control logic means 74. Control logic means 74 may be combinatorial logic or a programmed microprocessor. The main function of control logic means 74 is to generate control signals 1 and 2, respectively, and to lock onto the address once it is determined that an identical unit is able to read the address byte of the transmitted message. The other inputs to AND circuits 64 and 66 are controls 1 and 2, respectively.

Still referring to FIG. 4, the signal on conductor 72 is coupled over conductor 76 into address decoder 78. Address decoder 78 is a conventional circuit, details of which will not be given. The function of address decoder 78 is to decode the address signal transmitted over conductor 76. Once the address is decoded, if the address is "N", it is fed over conductor 80 into one input of an AND circuit identified by numeral 82. The other input to AND circuit 82 is control 1 which is fed over conductor 84. The output from AND circuit 82 is fed into logical OR circuit 86. If decoder 78 decodes a different address, say, (N+1), it is fed into one leg of AND circuit 88. The other input to AND circuit 88 is the electrical signal identified as control 2. The output from AND circuit 88 is fed into OR circuit 86. The output of OR circuit 86 is fed over conductor 90 into control logic means 74. As stated previously, and is obvious from the electrical circuit, the polarity of the control signals will determine which identical device will respond to a particular address.

Figure 5:
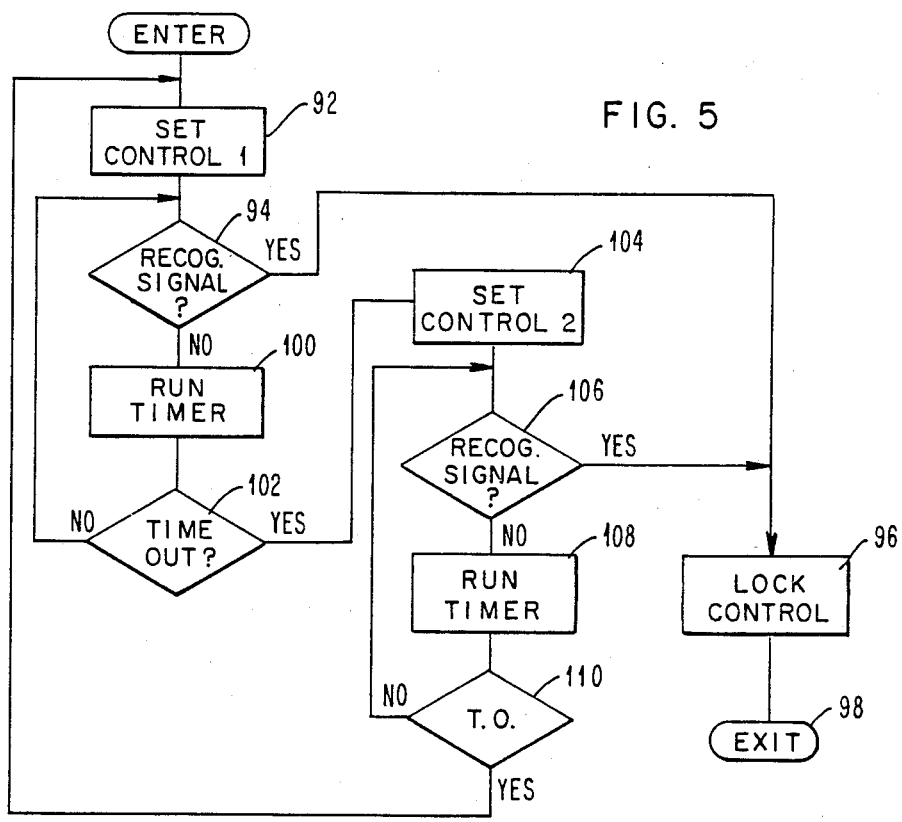
FIG. 5 shows a flow chart of a computer program which controls a microprocessor during the address assignment routine.

Referring now to FIG. 5, a flow chart for a program to control the microprocessor of control logic means 74 is shown. The first block in the program is the enter block. The microprocessor will enter into this program at power on reset (POR) or some other predetermined time. The next block in the program is identified by numeral 92. In block 92 the program sets control 1. Control 1 represents an electrical signal with a first polarity. It should be noted that the devices are designed to receive only signals with positive polarity. With control 1 set, the program next descends into conditional block 94. In block 94 the program checks to see if it recognizes the transmitted signal. The signal may be a specific message to one of the two identical devices or it may be a polled message. If the signal is recognized, the block is exited along the "yes" path and the program descends to operational block 96. In block 96 the control is locked and that unit will respond to the message. Once the control is locked, the program descends into exit block 98 and exit the routine.

Still referring to FIG. 5, if the programmed microprocessor does not recognize the signal (block 94), the program descends along the "no" path and enters operational block 100. In block 100 a timer is set for a predetermined period of time. The program then enters decisional block 102. In decisional block 102 the program tests to see if the set time is exceeded. If it is, the program exits along the "yes" path and sets control 2 (operational block 104). The program then enters decisional block 106. In decisional block 106 the program checks to see if the signal is recognized. If it is, the program exits the block along the "yes" path and enters control blocks 96 and 98, respectively. The function of blocks 96 and 98 have already been described and will not be repeated.

If the signal is not recognized (block 106), the program exits along the "no" path and runs a timer. The timer is indicated in functional block 108. From block 108 the program descends into decisional block 110. Decisional block 110 represents the timeout (T.O.) block. If the timeout period is less than the period set in the timer block 108, the program exits the "no" path and loops until the timeout occurs. At timeout the program exits the "yes" path and re-enters block 92.

Still referring to FIG. 5, if the timeout block 102 is less than the time set by timer 100, the program enters a loop along the "no" path from the decisional block 102.

Operation

Having described the hardware which is needed to implement the invention, a description of the operation of the inventive method and circuits will now be given. As stated before, the circuitry is designed to receive positive polarity signals. The signal is prepared at the supervisory unit 10 (FIG. 1) and is transmitted over conductors 34-42 to a plurality of remote devices. With reference to FIG. 4, the signal is transmitted over conductors 48 and 50 to receiver 60. An address is placed in the address byte of the message which is transmitted from the supervisory unit. The message may be for other control units other than devices 20 and 22 or a polled message. A polled message is a message which informs the particular I/O device to respond to the supervisory unit. The I/O unit that is connected to the positively wired port, say port 30 of FIG. 1, recognizes a good message and a signal is outputted on conductor 112 (FIG. 4). It should be noted that the output from AND circuit 64 and conductor 112 is generated by two positive input signals. One of the signals is the transmitted message and the other is a positive control signal 1. With a positive signal on conductor 112, the OR block passes the signal through the conductor 72 onto conductor 76 where it is decoded by address decoder 78. That signal is outputted on conductor 80, gated with a positive control signal and is transmitted through logical OR circuit 86, conductor 90, and into control logic means 74 where the address is locked up and only unit 20 will respond to the supervisory unit.

During this time interval the I/O device which is connected to port 32 (wired with reverse polarity) cannot read the message. Simultaneously, with attempting to read the signal, the control logic means sets a timer which runs for a predetermined time period. If unit 22, FIG. 1, (which is connected to the reverse wired terminal) cannot read the message, the signal is inverted in inverter 68 (FIG. 4) and is fed into one input of the AND circuit 66. The control logic means 74 generates control 2 which is the reverse polarity of control 1. Control 2 is gated with the reverse signal that is on AND circuit 66. Both signals to the input of AND circuit 66 are now positive and a signal is outputted on conductor 114. The signal on conductor 114 is processed in a similar manner as the previously described signal on conductor 112. As a result of the processing, a second address represented by (N+1) is assigned to the device which is coupled to port 32 (FIG. 1). Thereafter, I/O device 22 will respond to messages having the (N+1) address. In summary, the invention listed herein includes a learning period wherein the above series of process steps are performed and each identical I/O unit learns its designated address. Once the address is assigned, thereafter information is exchanged between the supervisory unit and the identical I/O device based on the assigned address.

The aforementioned described method is automatic and does not require the intervention of an operator and as such the probability of making error is substantially reduced. Also, no physical modification is necessary for personalizing the address.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A method for assigning unique addresses to identical devices connected by means of a serial communication link to a supervisory unit, said method comprising the following steps:
   (a) generating a message;
   (b) transmitting the message to each device with either a first or a second polarity;
   (c) receiving the message at each of the identical devices;
   (d) generating, in each device, a first control signal having a first polarity;
   (e) combining the first control signal with the received message to form a first combined signal;
   (f) reading the first combined signal; and
   (g) assigning a first unique address to the devices capable of reading the first combined signal.

2. The method recited in claim 1 further including the steps of:
   (a) generating a second control signal with a (reversing the) polarity opposite to the polarity of the first control signal;
   (b) combining the (reversed polarity) second control signal with the transmitted message to form a second combined signal;
   (c) reading the second combined signal; and
   (d) assigning a second unique address to (all) the (devices) device recognizing the second combined signal.

3. The method of claim 1 wherein the polarity of the first control signal is identical to the normal polarity of the transmitted message.

4. The method of claim 2 wherein the polarity of the second control signal is opposite to the normal polarity of the transmitted message.

5. An apparatus for assigning unique addresses to identical devices connected by means of a serial communication link to a supervisory unit, said apparatus comprising:
   generating means, including the supervisory unit, operable for preparing a test message;
   transmitting means operable for transmitting the test message with a normal and a reverse polarity;
   receiving means, provided at the identical devices, operable for receiving the test message;
   means provided at each identical device operable for generating a first control signal with a first polarity;
   means provided at each identical device operable for processing the first control signal and the test message to form a first composite signal; and
   means operable for reading the composite signal and assigning a first unique address to one device capable of reading the first composite signal.

6. An apparatus for assigning unique addresses to identical devices connected by means of a serial communication link to a supervisory unit, said apparatus comprising:
   generating means, including the supervisory unit, operable for preparing a test message;
   transmitting means operable for transmitting the test message with a normal and a reverse polarity;
   receiving means, provided at the identical devices, operable for receiving the test message;
   means provided at each identical device operable for generating a first control signal with a first polarity;
   means provided at each identical device operable for processing the first control signal and the test message to form a first composite signal;
   means operable for reading the composite signal and assigning a first unique address to one device capable of reading the first composite signal;
   means provided at the devices and operable for generating a second control signal, said control signal having a polarity opposite to the polarity of the first control signal;
   means provided at the devices and operable for processing the second control signal with the transmitted test (signal) message to form a second composite signal;
   means for reading the second composite signal and assigning a second unique address to a device capable of reading the second signal.

7. The apparatus of claim 5 wherein the generating means includes a microcomputer programmed to prepare the message.

8. The apparatus of claim 5 wherein the transmitting means is comprised of at least two receptacle ports, one of which is being wired to emit a normal polarity electrical signal and the other is being wired to emit reverse polarity signals.

9. An improved data transmission system comprising:
   a supervisory unit having at least two receptacle ports;
   a plurality of remote devices coupled to the supervisory unit, said devices including at least two identical devices;
   at least two serial communication links, one of each coupling one of the identical devices to one of the receptacle ports;
   means in the supervisory unit operable for preparing and supplying electrical test signals having normal and reverse polarity to the receptacle ports;
   means in the identical devices operable to receive the test signals;
   means in the identical devices operable for generating at least two control signals one having a normal polarity and the other having a reverse polarity;

means in the identical devices operable for selectively combining the test signals with the control signals to form composite signals and to assign a first unique address to the identical device whose composite signal exhibits a predetermined characteristic and a different unique address to the identical device whose composite signal exhibits a predetermined characteristic.

10. A method for assigning unique addresses to identical devices connected via a serial communication link to a main processing unit, said method comprising of the following steps:
    generating a message or signal with an address byte recognizable to all the identical devices;
    transmitting the signal with a normal and a reverse polarity;
    receiving the signal in each identical device;
    generating, in each identical device, a first control signal having a first polarity substantially the same as the polarity of the transmitted signal;
    processing the first control signal and the transmitted signal to form a first composite signal;
    reading the first composite signal;
    assigning a first unique address to the device capable of reading the first composite signal;
    reversing the polarity of the first control signal, for the device not being able to read the first composite signal;
    processing the reversed polarity signal with the transmitted signal to form a second composite signal;
    reading the composite signal; and
    assigning a second unique address to the device capable of recognizing said second composite signal.

11. An apparatus for assigning unique addresses to identical devices connected by means of a serial communication link to a supervisory unit, said apparatus comprising:
    generating means, including the supervisory unit, operable for preparing a message;
    transmitting means operable for transmitting the message with a normal and a reverse polarity;
    receiving means, provided at the identical devices, operable for receiving the message;
    means provided at each identical device operable for generating a plurality of control signals with each signal having a different polarity;
    means provided at each identical device operable for processing the control signals and the message to form a composite signal; and
    means operable for reading the composite signal and assigning a unique address to a device capable of reading the composite signal.

12. A method for assigning unique addresses to identical devices connected by means of a serial communication link to a supervisory unit, said apparatus comprising:
    generating a message at the supervisory unit;
    transmitting the message with a normal and a reverse polarity;
    receiving the message at the identical devices;
    generating at each identical device a plurality of control signals with each signal having a different polarity;
    correlating the control signals and the message to form a composite signal; and
    assigning a first unique address to each device capable of reading the composite signal.

* * * * *